(12) United States Patent
Ko et al.

(10) Patent No.: US 11,687,383 B1
(45) Date of Patent: *Jun. 27, 2023

(54) DISTRIBUTED API ACCOUNTING

(71) Applicant: Google LLC, Mountain View, CA (US)

(72) Inventors: Scott K. Ko, Mountain View, CA (US); Oleksandr Khimich, Mountain View, CA (US); Kenneth Chan, Mountain View, CA (US); Rajanish Jagadish Gundlupet, Mountain View, CA (US); Sri Harsha Chevuru, San Jose, CA (US); Mahesh Bingi, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/245,555

(22) Filed: Apr. 30, 2021

Related U.S. Application Data

(63) Continuation of application No. 16/579,377, filed on Sep. 23, 2019, now Pat. No. 11,023,294, which is a continuation of application No. 15/265,096, filed on Sep. 14, 2016, now Pat. No. 10,445,151.

(51) Int. Cl.
| | | |
|---|---|---|
| *G06F 15/16* | (2006.01) | |
| *G06F 9/54* | (2006.01) | |
| *H04L 41/046* | (2022.01) | |
| *H04L 67/10* | (2022.01) | |
| *G06F 11/34* | (2006.01) | |
| *H04L 67/60* | (2022.01) | |
| *H04L 67/568* | (2022.01) | |

(52) U.S. Cl.
CPC .............. *G06F 9/541* (2013.01); *G06F 9/542* (2013.01); *G06F 11/3409* (2013.01); *G06F 11/3466* (2013.01); *H04L 41/046* (2013.01); *H04L 67/10* (2013.01); *H04L 67/568* (2022.05); *H04L 67/60* (2022.05)

(58) Field of Classification Search
CPC ... G06F 11/3419; G06F 16/958; G06Q 30/06; H04L 67/2842; H04L 67/1008; H04L 67/565; H04W 24/08
See application file for complete search history.

(56) References Cited

U.S. PATENT DOCUMENTS

| | | |
|---|---|---|
| 6,792,392 B1 | 9/2004 | Knight |
| 7,133,912 B1 | 11/2006 | Gary |
| 7,698,397 B2 | 4/2010 | Pang |
| 8,239,543 B1 | 8/2012 | Ramany et al. |
| 9,900,264 B1 | 2/2018 | Chen et al. |

(Continued)

*Primary Examiner* — Dustin Nguyen
(74) *Attorney, Agent, or Firm* — Lerner David LLP

(57) ABSTRACT

Distributed API accounting is disclosed, including: receiving from respective ones of a plurality of agents, a plurality of local counter values corresponding to an application programming interface (API) service counter identifier; logging the plurality of local counter values corresponding to the API service counter identifier; receiving a request for an aggregated counter value associated with the API service counter identifier; combining at least some of the logged plurality of local counter values associated with the API service counter identifier to determine the aggregated counter value corresponding to the API service counter identifier; and storing the aggregated counter value corresponding to the API service counter identifier.

17 Claims, 14 Drawing Sheets

(56) References Cited

U.S. PATENT DOCUMENTS

| | | | |
|---|---|---|---|
| 10,425,465 B1* | 9/2019 | Jha | H04L 67/565 |
| 10,635,505 B2 | 4/2020 | Chen et al. | |
| 2007/0250906 A1 | 10/2007 | Hattori | |
| 2007/0294673 A1* | 12/2007 | Guerrera | G06F 11/3419 |
| | | | 717/130 |
| 2008/0209451 A1 | 8/2008 | Michels et al. | |
| 2009/0106821 A1 | 4/2009 | Kothari et al. | |
| 2009/0249369 A1 | 10/2009 | Itoh | |
| 2012/0102179 A1* | 4/2012 | Qiu | G06Q 30/06 |
| | | | 709/223 |
| 2012/0180021 A1 | 7/2012 | Byrd | |
| 2013/0212603 A1 | 8/2013 | Cooke | |
| 2014/0106704 A1* | 4/2014 | Cooke | H04W 24/08 |
| | | | 455/405 |
| 2015/0180863 A1 | 6/2015 | Kobayashi | |
| 2015/0193600 A1 | 7/2015 | Matsuda | |
| 2015/0220376 A1 | 8/2015 | Srivastava | |
| 2015/0222504 A1 | 8/2015 | Srivastava | |
| 2015/0229579 A1* | 8/2015 | Kosim-Satyaputra | |
| | | | H04L 67/2842 |
| | | | 709/225 |
| 2015/0341232 A1 | 11/2015 | Hofleitner | |
| 2016/0103750 A1 | 4/2016 | Cooper | |
| 2017/0185797 A1* | 6/2017 | Valine | G06F 16/958 |
| 2018/0062944 A1* | 3/2018 | Altman | H04L 67/1008 |

* cited by examiner

Stored by Agent A at Edge Server

| API Service Counter ID | Local Counter Value |
|---|---|
| Cat | 8 |
| Dog | 19 |
| Mouse | 20 |
| Bird | 33 |
| ... | ... |

Stored by Master Counter Server Before Update from Agent A

1100

1102

| Partition ID | API Service Counter ID | Local Counter Value | Update Time |
|---|---|---|---|
| A | Cat | 8 | 12:00:00 |
| A | Dog | 1 | 12:00:00 |
| A | Mouse | 5 | 12:00:00 |
| A | Bird | 6 | 12:00:00 |
| B | Cat | 10 | 12:00:00 |
| C | Cat | 3 | 12:00:00 |
| ... | ... | ... | ... |

FIG. 11

Stored by Master Counter Server After Determining Agents B and C are Unavailable

1300

| Partition ID | API Service Counter ID | Local Counter Value | Update Time |
|---|---|---|---|
| A | Cat | 10 | 12:01:31 |
| A | Dog | 21 | 12:01:31 |
| A | Mouse | 34 | 12:01:31 |
| A | Bird | 36 | 12:01:31 |
| <u>Internal</u> | Cat | <u>79</u> | 12:01:31 |
| ... | ... | ... | ... |

1302 points to the first row; 1304 points to the Internal row.

FIG. 13

DISTRIBUTED API ACCOUNTING

CROSS-REFERENCE TO RELATED APPLICATIONS

The present application is a continuation of U.S. patent application Ser. No. 16/579,377 (now U.S. Pat. No. 11,023,294), filed on Sep. 23, 2019, which is a continuation of U.S. patent application Ser. No. 15/265,096 (now U.S. Pat. No. 10,445,151), filed on Sep. 14, 2016, the disclosures of which are incorporated herein by reference.

BACKGROUND OF THE INVENTION

Due to limited resources and other constraints, the number of application programming interface (API) requests for such resources that can be serviced may be limited. In some conventional systems, a single, central counter (e.g., running on a central server) that tracks the total number of API requests that have already been serviced is maintained for multiple, potentially distributed edge servers that individually perform servicing of API requests. Each edge server would need to notify the central counter whenever the edge server has serviced an API request. However, processing the notification of every serviced API request in real-time at the central server may be computationally expensive as the number of notifications could be large and/or received simultaneously. Moreover, any loss of connection between the central server and any edge server may cause the central server to fail to receive some notifications of serviced API requests and therefore hinder the enforcement of a limit on the total number of API requests that can be serviced across all the distributed edge servers.

BRIEF DESCRIPTION OF THE DRAWINGS

Various embodiments of the invention are disclosed in the following detailed description and the accompanying drawings.

FIG. 10 is a diagram showing an example of a set of local counter values that is stored by an agent executing at an edge server.

FIG. 11 is a diagram showing an example of a set of local counter values that is stored by a master counter server prior to receiving new local counter values from an agent.

FIG. 13 is a diagram showing an example of a set of local counter values that is stored by a master counter server subsequent to determining that agents have become unavailable and subsequent to performing a cleanse process.

DETAILED DESCRIPTION

Figure 1:
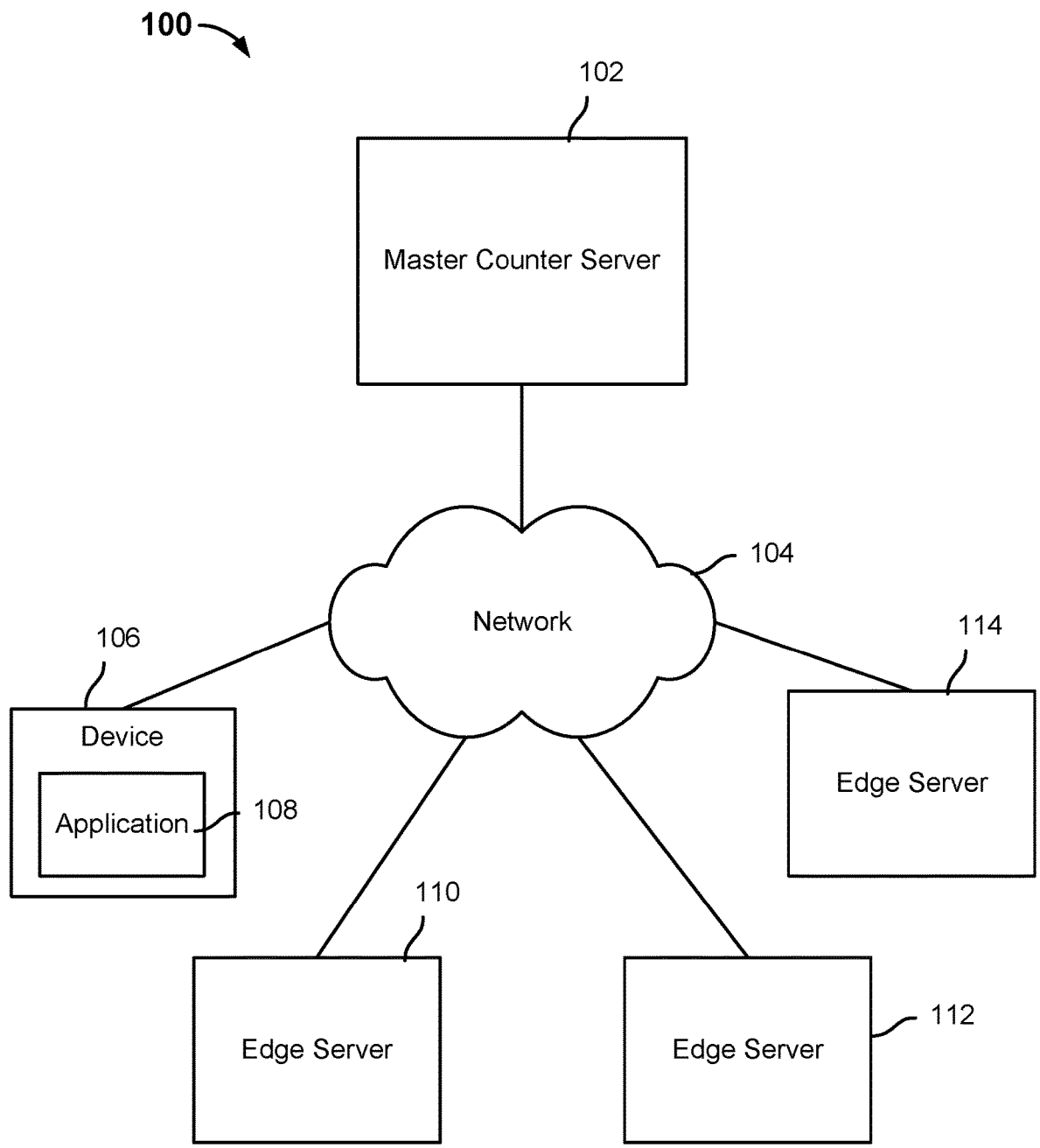
FIG. 1 is a diagram showing an embodiment of a system for distributed API accounting.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of performing distributed counting are described herein. A plurality of local counter values associated with an application programming interface (API) service counter identifier (ID) is received at a master counter server. For example, the API service counter identifier is associated with a configured limit on the number of API requests that can be serviced for a combination of a particular API service and a particular developer of an application. For example, the limit is based on a subscription/rate plan that is selected by that particular developer. In various embodiments, the local counter value corresponding to the API service counter identifier that is received from an agent represents a number of API requests associated with that API service counter identifier that has been serviced by an edge server at which the agent is executing. The plurality of local counter values associated with the API service counter identifier that is received from the various agents is logged at the master counter server. A request for an aggregated counter value corresponding to the API service counter identifier is received at the master counter server. At least some of the plurality of local counter values corresponding to the API service counter identifier are combined to determine the aggregated counter value corresponding to the API service counter identifier. The aggregated counter value corresponding to the API service counter identifier is stored.

By providing agents that asynchronously flush updated local counter values to a master counter server, the master counter server can efficiently track the number of API requests that are serviced at various edge servers. When an agent has reached a predetermined condition (e.g., when the agent has consumed its storage allocation for storing local counter values), that agent can be disabled and a new agent can be generated without any disruption to the updating of the local counter values at the edge server or the flushing of local counter values to the master counter server. At any given time, the master counter server can compute an aggregated counter value corresponding to a particular API service counter identifier based on the local counter values corresponding to that API service counter identifier that the master counter server has already logged, without needing to request any additional information from another entity (e.g., an edge server). As a result, the master counter server can efficiently detect when a maximum limit associated with an API service counter identifier has been met and can therefore store an indication to block subsequent API requests corresponding to that API service counter identifier. Frequent querying for any updates that have been stored at the master counter server, including any new indications to block API requests of a certain API service counter identifier, by edge servers (or other entities), enables the efficient dissemination of commands to deny subsequent service for API requests associated with blocked API service counter identifiers.

FIG. 1 is a diagram showing an embodiment of a system for distributed API accounting. In the example, system 100 includes master counter server 102, network 104, device 106, edge server 110, edge server 112, and edge server 114. In some embodiments, each of master counter server 102, device 106, edge server 110, edge server 112, and edge server 114 communicates to one another over network 104.

Any of the components shown in FIG. 1 may represent one or more physical devices. Any of the components shown in FIG. 1 may be integrated together with one or more other components shown in FIG. 1 and/or a component not shown in FIG. 1. Examples of device 106 include a server, a personal computer, a desktop computer, an electronic reader, a laptop computer, a storage, a smartphone, a tablet computer, a mobile device, a wearable device, a wearable computer, and any other computer or electronic device. Examples of network 104 include one or more of the following: a direct or indirect physical communication connection, a mobile communication network, a cellular network, a wireless network, Internet, intranet, Local Area Network, Wide Area Network, Storage Area Network, and any other form of connecting two or more systems, components, or storage devices together. In various embodiments, the components shown in FIG. 1 may exist in various combinations of hardware machines. Other communication paths may exist and the example of FIG. 1 has been simplified to illustrate the example clearly. Although single instances of components have been shown to simplify the diagram, additional instances of any of the components shown in FIG. 1 may exist. Components not shown in FIG. 1 may also exist to perform and provide functions and services described in this document.

Often, providers want to make their backend services available online for consumption by applications running on mobile devices and desktops. For example, an organization might want to expose its services that provide product pricing and availability information, sales and ordering services, order tracking services, and any other services required by client applications by exposing services as a set of web endpoints. Client application developers may then make web requests to these endpoints in developed application code. The client applications that consume these services can be implemented as standalone applications for a mobile device or tablet, as web applications running in a browser, or as any other type of application that can make a request to a web endpoint and consume any response data. These applications might be developed and released by the same organization that exposed the services or by third-party application developers who make use of publicly available services.

Developers also face challenges when trying to consume services from different providers. The same client application might have to use one mechanism to consume a service from one provider, and a different mechanism to consume a service from a different provider. Developers must ensure that they have taken all necessary steps to secure and protect their services from unauthorized access. Security credentials also have to be carefully managed to ensure that security credentials required to utilize services do not become compromised by unauthorized users. After a client application that accesses services has been released, a service provider is then required to make sure that those services continue to function over time as they add, modify, or delete those services. The service provider must also have a way to keep developers aware of any changes to the services to ensure that client applications stay in sync with those services.

In some embodiments, an API service platform (not shown), that includes edge servers 110, 112, and 114, and master counter server 102, enables secure access to a backend service (not shown) via an API (e.g., well-defined API that is consistent across services, regardless of service implementation) hosted by the platform. For example, rather than having a client application (e.g., application 108) access the backend service directly, the client application accesses the platform that functions to map a publicly available web endpoint via an API to the backend service. The backend service may include any service provider and/or content repository of an organization. In some embodiments, in effect, the platform acts as a proxy for content and/or a server provided by the backend service. In some embodiments, a developer of application 108 provides application code that will implement functionality of an API provided by the platform to access services of the backend service. For example, application 108 interacts with application code provided by a developer (e.g., API implementing code provided by the developer) and implemented on the platform to access services of the backend service. In some embodiments, the backend service is optional and application code provided by the developer provides functionality without accessing the backend service. In some embodiments, the developer also programs a user application to access services of the platform. For example, the developer develops both a user application to be executed by a user and application code executed by the platform that interfaces with the user application to provide access to the backend service. The application code (e.g., compiled program, uncompiled program, source code, script, API implementation code, etc.) provided by the developer may be stored by the platform.

The API service platform provides its services using one or more API edge servers, such as edge servers 110, 112, and 114, that each handle API requests. By utilizing a plurality of API edge servers, fault tolerance, load balancing, and geographical distribution may be achieved. For example, each request is routed to one of the API edge servers handling requests based on current load of the servers and geographical closeness of the requester to a particular API edge server.

In some embodiments, the API service platform is able to handle the security and authorization tasks required to protect backend services, as well as to analyze, track, manage, monitor, and monetize the services. Because applications of developers make requests to the platform, rather than directly to the backend service, developers do not need to know the implementation detail of the backend service. Thus the platform may allow isolation of developers from backend services. In some embodiments, policies on the platform are utilized to add functionality to a service without having to make any changes to the backend service. For example, policies may be added to perform data transformations and filtering, add security, execute conditional logic or custom code, and to perform many other actions. In another example, access may be revoked/modified so that a particular user application no longer has full access to the backend services. In another example, policies may be implemented to limit, track, and manage access to services. For example, an API product may be limited by a maximum limit on the number of requests allowed. In this example, one API product may be made available with a low access limit, such as 1,000 requests per day, for a low price, while another API product provides access to the same API services, but with a much higher access limit, for a higher price. In some embodiments, the platform provides tools for adding and configuring APIs, applications, and related policies. In some embodiments, the platform is deployed within the computing environment of the backend service. In some embodiments, the platform is deployed in the cloud (SaaS) where multiple entities may share the platform.

In some embodiments, the platform provides API, analytics, and developer services. These services together may provide a comprehensive infrastructure for API creation, security, management, and operations, as well as backend services for developing client applications. In some embodiments, API services provide API creation and utilization services. For example, tools for adding and configuring APIs, setting up API products, and managing application developers and client apps are provided. Policies may be implemented to add security, rate-limiting, mediation, caching, etc. Behaviors may be customized by applying custom scripts, making calls out to third-party APIs and services, etc. In another example, a flexible data store and features such as social graphs, geolocation, user management, push notifications, performance monitoring, etc. are provided. In some embodiments, Java node.js may be implemented to create APIs and API mashups. In some embodiments, analytics services provide powerful tools to analyze short- and long-term usage trends of APIs. For example, audiences may be segmented by top developers and apps to understand usage by API methods to know where to invest, and create custom reports on business- or operational-level information. In some embodiments, as data passes through the platform, several types of information are collected including URL, IP, user ID for API call information, latency, error data, etc. Policies may be created to add other information, such as headers, query parameters, and portions of a request or response extracted from XML or JSON. In some embodiments, the information is collected asynchronously from the actual request/response flow and does not affect API performance. In some embodiments, developer services provide the tools to manage the community of application developers using such services. Developer services may offer the flexibility to work with internal and external developers and formalize these relationships with financial models. In some embodiments, developer services are utilized to onboard developers and create a developer portal for publicly available API products. Application developers may connect to the portal to access API documentation, forums, blog entries, etc. In some embodiments, monetization capabilities provide the financial infrastructure and relationships for digital assets. Monetization may allow a variety of rate plans that charge for the use of API products or through revenue-sharing. Monetization plans may include pre-paid plans, post-paid plans, fixed-fee plans, variable rate plans, "freemium" plans, etc. In some embodiments, the platform provides monetization reporting and billing services.

In some embodiments, a code repository included in the API service platform stores program code to be executed/implemented by the platform. For example, one or more developers provide application code (e.g., code implementing one or more APIs) to be executed by the platform. In some embodiments, application code provided by a device used by the developer, stored in the code repository, and/or executed by the platform may access third-party services provided by a third-party service. For example, content is obtained from the third-party service that is controlled by an entity external to an entity of the backend service, the platform, and a device associated with a user. In some embodiments, each API request to the platform includes an API key that verifies access to the services of the platform. The API key may be revoked and/or limited (e.g., limited in time, limited in count, limited in manner associated with a quota, etc.) dynamically.

In some embodiments, program code provided by a device used by the developer may need to access the backend service and/or the third-party service using one or more security credentials. For example, the backend service and/or the third-party service may require a valid username and password login to access its services. Although the credential may be directly specified in application code that is to utilize the credentials to access a desired service (e.g., stored directly within code provided by the developer), storing security credentials in unsecured program code exposes the credentials to vulnerabilities. For example, the code may be stored by the developer in a third-party code version control repository (e.g., insecure public repository) and the program code may unintentionally become exposed to unauthorized parties via the third-party code repository. Additionally in some cases, it may not be desirable to expose credentials to a developer. For example, it may be desirable to enable a developer to develop code without direct knowledge of security credentials.

In some embodiments, credentials are stored in a credential store included in the API service platform. For example, security credentials to be utilized by application code executed by the platform are stored in the credential store. The credentials may be provided by a device used by the developer and/or an administrator (e.g., by allowing the administrator to provide security credentials, the developer does not need to possess direct knowledge of the credentials). In some embodiments, credentials are provided for storage in the credential store via an API. In some embodiments, each stored security credential is associated with a reference identifier that can be utilized to identify the specific credential. For example, instead of directly including security credentials in application code, a reference to the security credentials may be utilized to reference the security credentials. When the application code is later executed, the reference may be utilized to obtain the referenced security credentials for use.

In some embodiments, only computer code executing on the platform has access to obtain credentials stored in the credential store. For example, once security credentials are provided to the credential store for storage, the stored credentials may be only obtained from the credential store by code executing within an application execution environment provided by the platform. In some embodiments, the connection between the platform and the credential store is a physically secure connection. For example, a direct physical connection that is not connected to other components connects the platform and the credential store. In some embodiments, the platform has exclusive access to obtain credentials from the credential store. The platform may host a plurality of different execution environments. In some embodiments, each credential stored in the credential store is scoped to one or more execution environments and may only be utilized by code executing within a scoped execution environment.

In some embodiments, credentials stored in the credential store are encrypted. In some embodiments, security credentials stored in the credential store are encrypted using a plurality of different encryption keys. For example, security credentials for each different organization and/or execution environment are encrypted using an encryption key unique to the organization/environment. In some embodiments, encryption keys utilized to encrypt security credentials stored in the credential store are stored and encrypted in a hardware security module. In some embodiments, the hardware security module is a dedicated physical crypto processing device that safeguards and manages encryption keys. Access to the hardware security module may be protected by a master encryption key. In some embodiments, rather than utilizing a hardware security module, a storage that stores a master key encrypted encryption key is utilized.

Devices such as device 106 are configured to run user applications such as application 108. For example, device 106 comprises a smartphone, a tablet device, a desktop computer, a laptop computer, or any computing device. The developer of applications such as application 108 may pay for a rate plan or a subscription involving a maximum limit of API requests for a particular API service that originate from instances of application 108 that can be handled by one or more of edge servers such as edge servers 110, 112, and 114. In various embodiments, an API service counter identifier identifies a particular developer and a particular API service for which the developer has purchased a rate plan. For example, a user operation performed at application 108 may cause an API request for a particular API service to be generated by application 108 and sent to an edge server such as one of edge servers 110, 112, and 114. For example, an API request may request for a service to provide backend data (e.g., data stored in a database) that is accessible to an edge server such as one of edge servers 110, 112, and 114. For example, the service provided by an edge server such as one of edge servers 110, 112, and 114 in response to an API request can be to return map data. In some embodiments, an application such as application 108 selects an API request recipient edge server (e.g., from among edge servers such as edge servers 110, 112, and 114) based on criteria such as a location of device 106, a location of the edge server, a service provided by the edge server, and the available processing capacity of the edge server, for example.

In various embodiments, each API request sent by an application to an edge server such as one of edge servers 110, 112, and 114 includes a key that identifies at least a unique API service counter ID, and it can be used to derive a developer associated with application 108, an API service that is requested, and a rate plan associated with the requested API service. The recipient edge server will respond to the API request if it has not received data from master counter server 102 that indicates to no longer service (e.g., block) requests associated with that requested API service counter identifier (e.g., because the maximum limit of API requests permitted for that requested API service counter identifier has been reached). In various embodiments, one or more agents are executing at each of each edge server such as one of edge servers 110, 112, and 114. In various embodiments, an agent comprises a process and/or a virtual machine executing at an edge server that is configured to update local counter values associated with one or more API service counter identifiers in response to the processing of API requests at the edge server at which the agent is executing. In various embodiments, the agent is further configured to periodically send such local counter values to master counter server 102. In various embodiments, an agent executing at the recipient edge server will query master counter service 102 for updates to the statuses of API service counter identifiers, which would include which API service counter identifiers should be blocked from further API request servicing, prior to servicing a received API request. After an API request has been serviced by the edge server, the agent executing at the edge server is configured to increment (e.g., by one) the locally stored counter value corresponding to the API service counter identifier associated with the recently serviced API request. Periodically (e.g., every second) or in response to a trigger event, the agent is configured to send all of its current local counter values corresponding to all API service counter identifiers to master counter server 102.

In some embodiments, an agent stores local counter values in a memory of an edge server. In some embodiments, an agent is assigned an allocation of storage in the memory of an edge server. In various embodiments, once the allocation of storage in the memory is used by an agent, that agent is disabled (e.g., discarded, deleted, and/or powered down) and a new agent with a new corresponding allocation of storage is created at the edge server to continue to track local counter values corresponding to API service counter identifiers. In various embodiments, each agent has a corresponding partition identifier that is assigned by master counter server 102. After a new agent is created at the edge server, the new agent is assigned a new partition identifier (one that is different than the partition identifier of the previously disabled agent) by master counter server 102. One advantage to disabling an agent whose corresponding allocation of storage has been used and generating a new agent is that the memory used by the disabled agent can be cleared and potentially reused by the new agent, which allows the management of memory to be simplified. Furthermore, embodiments of distributed API accounting as described herein promote high reliability of counter value management because even agents become disabled, and new agents are always spawned in their place so that at any time, there is always an available agent to continue updating counter values at an edge server.

Master counter server 102 is configured to receive local counter values corresponding to various API service counter identifiers from agents executing on one or more edge servers such as edge server 110, 112, and 114. Each local counter value corresponding to a particular API service counter identifier includes a partition identifier associated with the sending agent. In some embodiments, master counter server 102 determines whether a new, received local counter value corresponding to a particular API service counter identifier associated with the partition identifier is greater than a stored, existing local counter value corresponding to that particular API service counter identifier associated with the same partition identifier and will only store/log the new local counter value if it is greater than the stored local counter value.

In various embodiments, master counter server 102 receives a request to determine an aggregated counter value associated with a particular API service counter identifier. In response, master counter server 102 is configured to combine (e.g., sum) the logged local counter value(s) corresponding to the requested API service counter identifier across one or more partition identifiers for which local counter value(s) corresponding to the requested API service identifier exist, to determine the aggregated counter value associated with a particular API service counter identifier. In some embodiments, master counter server 102 is configured to store the determined aggregated counter value corresponding to the API service counter identifier in a cache (e.g., with a predetermined time-to-live). In some embodiments, master counter server 102 is configured to compare the aggregated counter value associated with a particular API service counter identifier to a maximum limit (e.g., associated with a developer associated with the particular API service counter identifier) to determine whether the maximum limit has been reached. In the event that the maximum limit has been reached, master counter server 102 is configured to store a block status associated with the particular API service counter identifier. The block status associated with the particular API service counter identifier can be pulled and enforced by agents executing at the edge servers. In various embodiments, master counter server 102 receives and stores rate plans, maximum limits associated with various developers, and other rules (e.g., determining that a certain API service counter identifier should be associated with a block status when its aggregated counter value has reached the maximum limit associated with that API service counter identifier). As a result, information such as rate plans, subscriptions, maximum limits associated with various developers, and other rules may be centrally updated and maintained at master counter server 102.

In some embodiments, master counter server 102 determines which agents have become unavailable (e.g., agents that have not sent updated local counter values over a predetermined length of time) and combines the local counter values associated with the same API service counter identifiers across such unavailable agents. The combined counter value associated with an API service counter identifier associated with unavailable agents is then stored corresponding to a partition identifier that is not associated with any particular available agent. For example, whereas each available agent is associated with the partition identifier that is an alphanumeric value, a partition identifier that is not associated with any particular available agent may be assigned to be a predetermined value (e.g., "internal").

As one example use case, application 108 may comprise a travel-related application. The developer of application 108 has subscribed to a rate plan of servicing 1,000 API requests for map data from various instances of application 108 executing across different devices. In response to a user's selection to receive more information regarding a certain location within application 108, application 108 can send an API request to edge server 110, which provides the requested map data back to application 108. The API request includes data that corresponds to one or more of the following: an API service counter identifier, a key that identifies an API service counter identifier and/or at least a developer associated with application 108, the requested service (e.g., retrieving map data), and a rate plan associated with the requested service. After servicing the API request from application 108, an agent executing at edge server 110 is configured to increment (e.g., by one) its local counter value corresponding to the API service counter identifier associated with the requested service. Edge server 110 is configured to send the current local counter value corresponding to the API service counter identifier associated with the requested service to master counter server 102. After receiving the requested map data, application 108 is configured to present the requested map data at device 106 for the user.

As will be described in further detail below, using a master counter server (e.g., master counter server 102) to centrally aggregate local counter values describing numbers of serviced API requests associated with various API service counter identifiers from multiple agents executing on distributed edge servers (e.g., edge servers 110, 112, and 114) helps to ensure accuracy in enforcing maximum limits associated with the API service counter identifiers across distributed agents. Not only can agents be executing on distributed edge servers, but the number of agents and/or edge servers that maintain and post local counter values to the master counter server may scale as needed without negatively affecting the aggregation process at the master counter server. Furthermore, information such as maximum limits associated with the API service counter identifiers may be centrally modified and maintained at the master counter server and remain transparent to the agents. Moreover, in various embodiments, the agents can pull updates, such as for which API service counter identifiers API requests should be blocked, from the master counter server, which relieves the master counter server from the processing needed to keep track of which API service counter identifiers are relevant to which agents. Additionally, disabling agents that have consumed their respective storage allocations and generating new agents promotes the efficient usage of memory.

Figure 2:
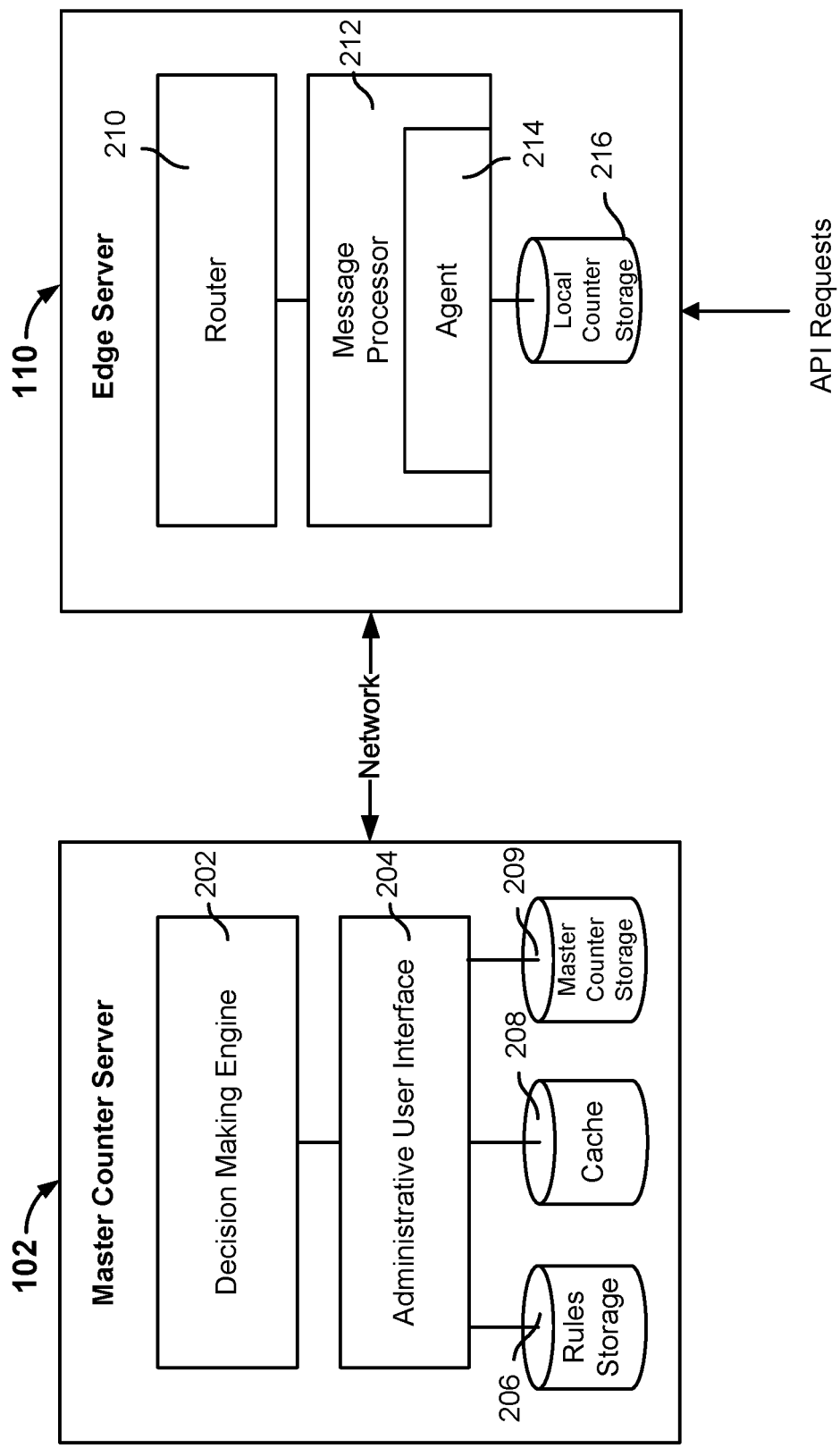
FIG. 2 is a diagram showing an example of a master counter server and an example of an edge server.

FIG. 2 is a diagram showing an example of a master counter server and an example of an edge server. In some embodiments, master counter server 102 of system 100 of FIG. 1 can be implemented using the example of the master counter server of FIG. 2. In some embodiments, edge server 110 (or 112 or 114) of system 100 of FIG. 1 can be implemented using the example of the edge server of FIG. 2.

As shown in FIG. 2, the example edge server includes router 210, message processor 212, and local counter storage 216. In the example of edge server 110 in FIG. 2, agent 214 executes on message processor 212. In other embodiments that are not shown in FIG. 2, agent 214 can alternatively execute on router 210. Agent 214 comprises a process (e.g., a script or other computer program) or a (e.g., Java) virtual machine that is configured to determine whether to update local counter values (e.g., that describe the number of API requests that have been serviced locally at the edge server on which it executes) associated with API service counter identifiers. Agent 214 is associated with a partition identifier (e.g., an alphanumeric value) that is assigned by the master counter server.

During runtime, API requests sent from various applications executing on various devices (not shown) are received at the edge server. In some embodiments, message processor 212 is configured to receive the API requests and service them. In some embodiments, a component of edge server 110 other than message processor 212 is configured to receive the API requests and service them. In some embodiments, prior to servicing an API request, router 210 is configured to identify an API service counter identifier associated with a particular developer using the data specified in the API request and query administrative user interface 204 of the master counter server for updates made with respect to various API service counter identifiers. Such updates may include whether statuses associated with API service counter identifiers have changed, such as whether a block status has been assigned to any API service counter identifiers. In the event that router 210 determines from the queried updates that the API service counter identifier associated with the API request has been associated with a block status, router 210 sends a message to message processor 212 to cause message processor 212 to deny service to the API request and optionally, send a message to the requestor application that the API request will not be serviced. Otherwise, in the event that router 210 determines from the queried updates that the API service counter identifier associated with the API request has not been associated with a block status, router 210 sends a message to message processor 212 to cause message processor 212 to provide service to the API request. How an API request is serviced by message processor 212 depends on the service that is associated with the API request. For example, message processor 212 may service an API request by retrieving data that is needed by an API request from a storage component (not shown in the diagram) in the edge server itself, retrieving data from a separate backend server (not shown in the diagram), and/or querying a third party service server (not shown in the diagram). Once the API request has been successfully serviced by message processor 212, agent 214 is configured to increment (e.g., by one) the local counter value stored in counter storage 216 corresponding to the API service counter identifier associated with the serviced API request. In some embodiments, after the API request has been successfully serviced by message processor 212, message processor 212 is also configured to store a logged event describing the completed service of that API request and the time at which it was serviced. For example, the logged event may describe the contents of the API request (e.g., the developer associated with the application from which the API request originated, the API service that was requested, the API service counter identifier, the requestor, the result of the API request servicing, etc.). In some embodiments, local counter storage 216 comprises non-persistent storage (e.g., memory). Periodically (e.g., every one second) or in response to another trigger event, agent 214 is configured to post/send, over a network, the local counter values associated with the respective API service counter identifiers to the master counter server. The master counter server is configured to store the received local counter values associated with the respective API service counter identifiers and also the partition identifiers associated with the agents at master counter storage 209.

In some embodiments, when agent 214 meets its allocated amount of storage in local counter storage 216, agent 214 is disabled and a new agent (not shown) is generated in message processor 212 to continue to track local counter values at the edge server. The new agent is configured to query administrative user interface 204 of the master counter server for a new partition identifier to be associated with the new agent. In some embodiments, the new agent may reuse at least a portion of the amount of storage in local counter storage 216 that was previously used by a now disabled agent to store new local counter values.

As shown in FIG. 2, the example master counter server includes decision making engine 202, administrative user interface 204, rules storage 206, cache 208, and master counter storage 209. In some embodiments, administrative user interface 204 is configured to receive rules, conditions, and/or criteria to be stored at rules storage 206. For example, the rules, conditions, and/or criteria describe the rate plans, subscriptions, maximum limits (e.g., on the total number of API requests that can be serviced across all edge servers) associated with one or more API service counter identifiers associated with each developer, and an action to be taken when a maximum limit associated with an API service counter identifier associated with a particular developer is met. For example, a store rule can indicate that once decision making engine 202 determines that a maximum limit associated with an API service counter identifier associated with a particular developer is met, a block status is stored at master counter storage 209 for that API service counter identifier associated with the particular developer.

Periodically (e.g., every one second), local counter values associated with the respective API service counter identifiers that are stored by various agents executing at various edge servers are received, over a network, at the master counter server and logged at master counter storage 209 with the partition identifiers of the agents that had sent the local counter values. In some embodiments, prior to storing a received local counter value corresponding to an API service counter identifier from an agent associated with a particular partition identifier, decision making engine 202 is configured to compare the received local counter value corresponding to the API service counter identifier to a previously stored local counter value corresponding to the same API service counter identifier and also associated with the particular partition identifier, if one exists. Decision making engine 202 is configured to only log the recently received local counter value corresponding to the API service counter identifier if it is greater than the previously stored received local counter value corresponding to the API service counter identifier and associated with the particular partition identifier.

Over time, decision making engine 202 may detect that one or more agents have become unavailable or disabled (e.g., as a result of not receiving any local counter values from the agents after a predetermined length of time). Decision making engine 202 can subsequently combine the local counter values associated with the same API service counter identifiers that have been logged with the partition identifiers of these unavailable agents. The combined counter value corresponding to an API service counter identifier across multiple unavailable agents can be stored with a partition identifier that is not assigned to any particular agent or rather is assigned to a collection of unavailable agents. For example, a partition identifier that is not assigned to any particular agent may be referred to as "internal."

In response to a request (e.g., from an agent executing at an edge server) for an aggregated counter value associated with a particular API service counter identifier that is received at the master counter server, decision making engine 202 is configured to combine (e.g., sum) the logged local counter value(s) associated with the requested API service counter identifier across one or more partition identifiers (including those partition identifiers associated with active agents and that are not assigned to a collection of unavailable agents e.g., "internal") into an aggregated counter value associated with the requested API service counter identifier. In some embodiments, decision making engine 202 is configured to store the aggregated counter value corresponding to an API service counter identifier at cache 208. In some embodiments, each aggregated counter value corresponding to an API service counter identifier is stored at cache 208 with a predetermined time-to-live (e.g., one second) attribute such that prior to the expiration of the time-to-live length, the aggregated counter value corresponding to an API service counter identifier that is stored at cache 20g can be retrieved from cache 208.

Figure 3:
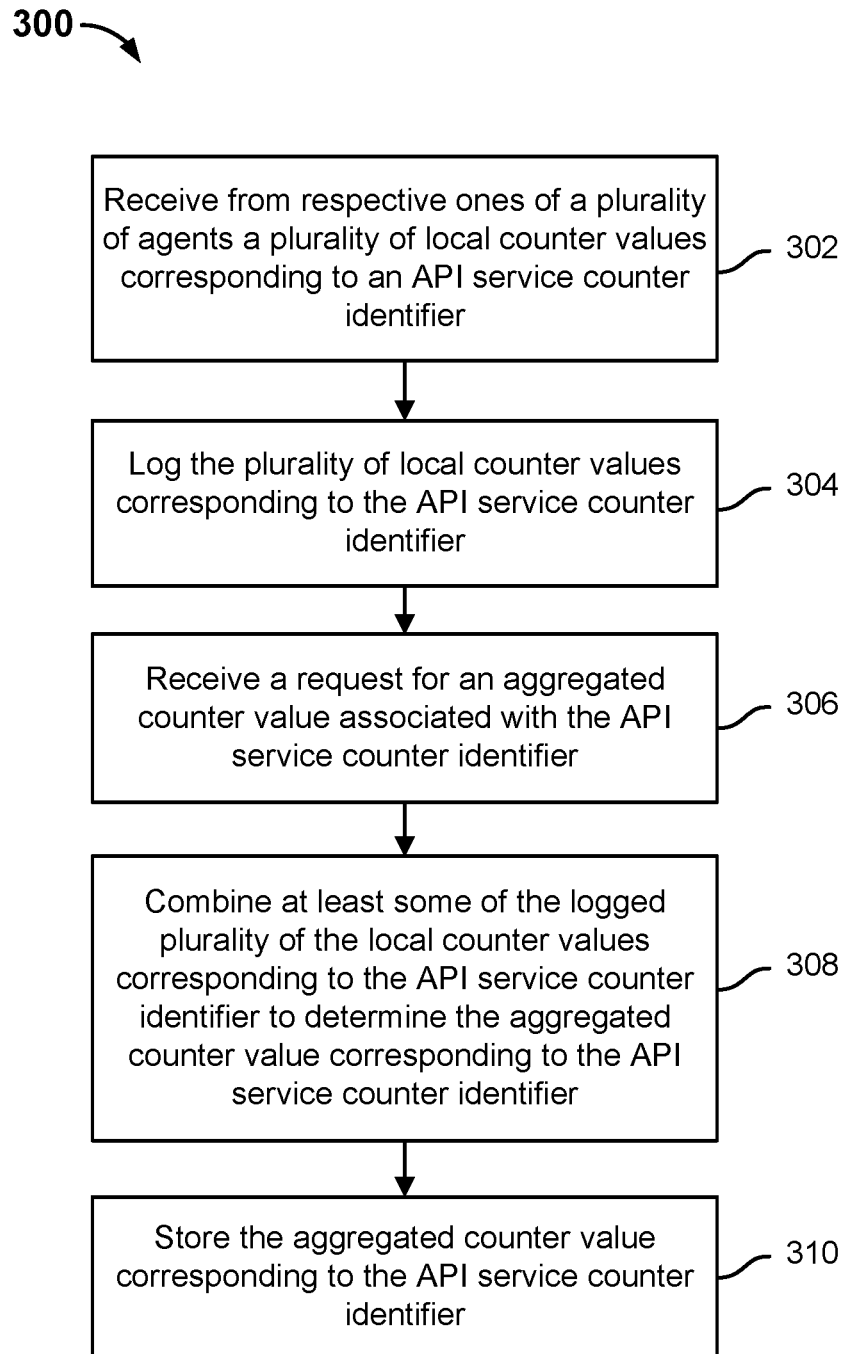
FIG. 3 is a flow diagram showing an embodiment of a process for performing distributed counting.

FIG. 3 is a flow diagram showing an embodiment of a process for performing distributed counting. In some embodiments, process 300 is implemented at master counter server 102 of system 100 of FIG. 1.

At 302, a plurality of local counter values associated with an API service counter identifier is received from a plurality of agents. Each agent is executing at an edge server (e.g., an edge server such as edge servers 110, 112, and 114 of system 100 of FIG. 1). In some embodiments, an edge server may run one or more agents. In various embodiments, an agent is configured to track a number of API requests for a particular API service that have been serviced by the edge server for one or more instances of an application that is developed by a particular developer, as a local counter value corresponding to an API counter identifier that maps to the combination of the particular API service and the particular application developer. As mentioned above, in various embodiments, an API service counter identifier identifies a particular developer and a particular API service for which the developer has purchased a rate plan, which includes a maximum number of API requests that can be serviced for the particular API service (e.g., within a given time period).

At 304, the plurality of local counter values is logged associated with the API service counter identifier. In various embodiments, each received local counter value corresponding to the API service counter identifier is logged with a partition identifier that corresponds to the agent that had sent the local counter value. In some embodiments, prior to storing a received local counter value corresponding to the API service counter identifier and the partition identifier associated with the sending agent, the received local counter value is compared to a previously logged local counter value corresponding to the API service counter identifier and the partition identifier associated with the same sending agent, if one exists. The received local counter value is only logged if it is greater than the previously logged local counter value corresponding to the API service counter identifier and the partition identifier associated with the same sending agent.

At 306, a request for an aggregated counter value corresponding to the API service counter identifier is received. In a first example, the request may be received from an agent. In a second example, the request may be received from a (e.g., user interface) component of a master counter server. In a third example, the request may be received from a notification service that is configured to periodically query for the aggregated counter value corresponding to the API service counter identifier and send a notification including the aggregated counter value to a developer associated with the API service counter identifier.

At 308, at least some of the plurality of counter values corresponding to the API service counter identifier are combined to determine an aggregated counter value corresponding to the API service counter identifier. Since local counter values associated with the same API service counter identifier can be maintained by different agents (e.g., executing on different edge servers), the local counter values received across various agents (and are therefore stored with various partition identifiers associated with the agents) are to be combined (e.g., summed together) to determine an aggregated counter value associated with that API service counter identifier. One reason to determine the aggregated counter value associated with that API service counter identifier is to check whether the aggregated counter value has met a maximum limit value that is stored for that API service counter identifier.

At 310, the aggregated counter value corresponding to the API service counter identifier is stored. In some embodiments, the aggregated counter value corresponding to the API service counter identifier is stored in a cache with a predetermined time-to-live value. For example, the predetermined time-to-live value can be configured to be one second and is used to indicate that the aggregated counter value corresponding to the API service counter identifier stored in the cache can be used to service requests for the aggregated counter value corresponding to the API service counter identifier for one second after it is stored in the cache prior to the cached value expiring in the cache.

Figure 4:
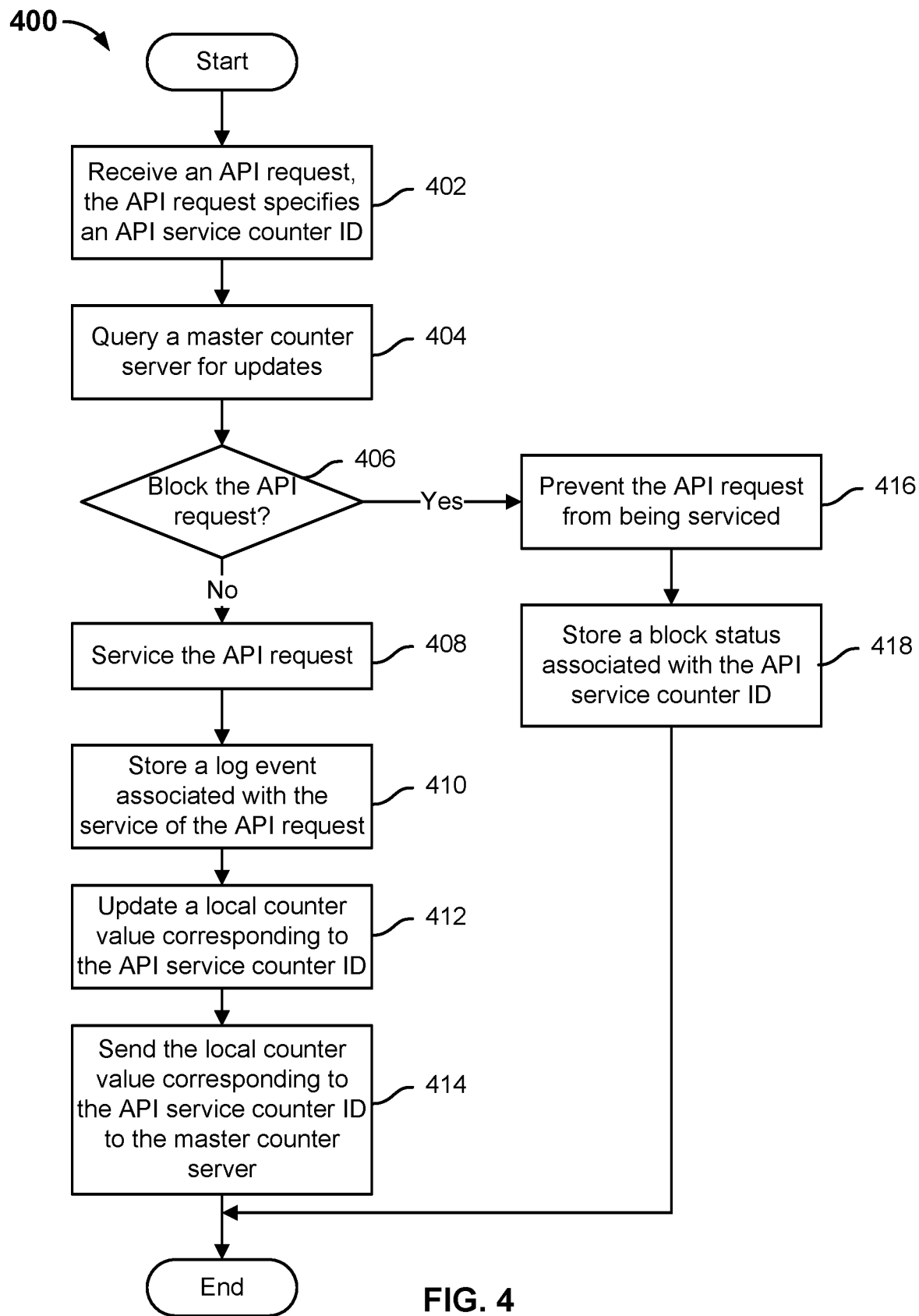
FIG. 4 is a flow diagram showing an example process for updating a local counter value corresponding to an API service counter identifier.

FIG. 4 is a flow diagram showing an example process for updating a local counter value corresponding to an API service counter identifier. In some embodiments, process 400 is implemented by an agent executing on an edge server such as edge server 110, 112, or 114 of system 100 of FIG. 1.

Process 400 describes an example process by which an agent running on an edge server can keep track of a number of API requests associated with a particular API service counter identifier that is serviced locally at the edge server. In some embodiments, process 400 can be implemented by each agent running on an edge server.

At 402, an API request is received, the API request specifies an API service counter identifier. The API request is received during runtime. In some embodiments, the API request includes data that identifies at least one or more of the following: a requested API service, a developer, and an API service counter identifier. In the event that the API service counter identifier is not included in the API request, the API service counter identifier can be mapped to using the combination of the requested API service and the developer that may be included in the API request.

At 404, a master query server is queried for updates. Prior to servicing the API request, the master counter server is queried for updates in statuses associated with various API service counter identifiers that have been stored at the master counter server. In various embodiments, a status associated with an API service counter identifier may indicate whether further API requests associated with the API service counter identifier should be blocked or not. In some embodiments, one reason why further API requests associated with the API service counter identifier should be blocked is because the maximum limit associated with API requests associated with the API service counter identifier has been reached across one or more edge servers (i.e., the aggregated counter value corresponding to the API service counter identifier has reached the maximum limit associated with API requests associated with the API service counter identifier).

In some embodiments, in response to the query from the agent, the master counter server sends data associated with the updates of any API service counter identifier for which a status has been updated (e.g., since a previous query or another previous event) and the agent can determine whether the API service counter identifier for which an API request has been received is included in such an update.

At 406, it is determined whether the API request should be blocked. In the event that the API request should be blocked, control is transferred to 416. Otherwise, in the event that the API request should not be blocked, control is transferred to 408. Whether the API request should be blocked and therefore denied service can be determined based on whether an update of a block status being stored for the API service counter identifier has been received and/or whether a block status associated with the API service counter identifier has been previously stored.

At 408, the API request is serviced. In the event that a block status has not been determined for the API service counter identifier associated with the received API request, the API request is serviced. Servicing the API request may include retrieving relevant data, performing a computation or operation on identified data, and/or sending a request to another entity (e.g., a third party service server), for example.

At 410, a log event associated with the service of the API request is stored. Information associated with the service of the API request (e.g., an API service requested by the API request, a developer that is associated with the API request, an API service counter identifier that is associated with the API request, when the API request was received or serviced, etc.) can be logged. In some embodiments, the logs can be sent periodically from the edge server to the master counter server. In some embodiments, the logs can be used by the master counter server to perform reconciliation processes, as will be described further below.

At 412, a local counter value corresponding to the API service counter identifier is updated. The local counter value corresponding to the API service counter identifier is incremented by one to reflect that another API request corresponding to the API service counter identifier has been serviced.

At 414, the local counter value corresponding to the API service counter identifier is sent to the master counter server. The local counter value corresponding to the API service counter identifier can be sent to the master counter server immediately after it is updated and/or in response to a trigger event (e.g., the elapse of one second or another predetermined interval of time since the last time the agent had sent the local counter value corresponding to the API service counter identifier to the master counter server). In some embodiments, the agent sends the local counter value corresponding to the API service counter identifier to the master counter server along with the agent's authentication token. In some embodiments, the agent's authentication token comprises a unique agent code (e.g., that was issued by the master counter server). For example, the agent's authentication token may comprise an OAuth token.

At 416, the API request is prevented from being serviced. In the event that a block status has not been determined for the API service counter identifier associated with the received API request, the service of the API request is denied.

At 418, a block status associated with the API service counter identifier is stored. This block status may be checked when a subsequent API request for the API service counter identifier is received.

Figure 5:
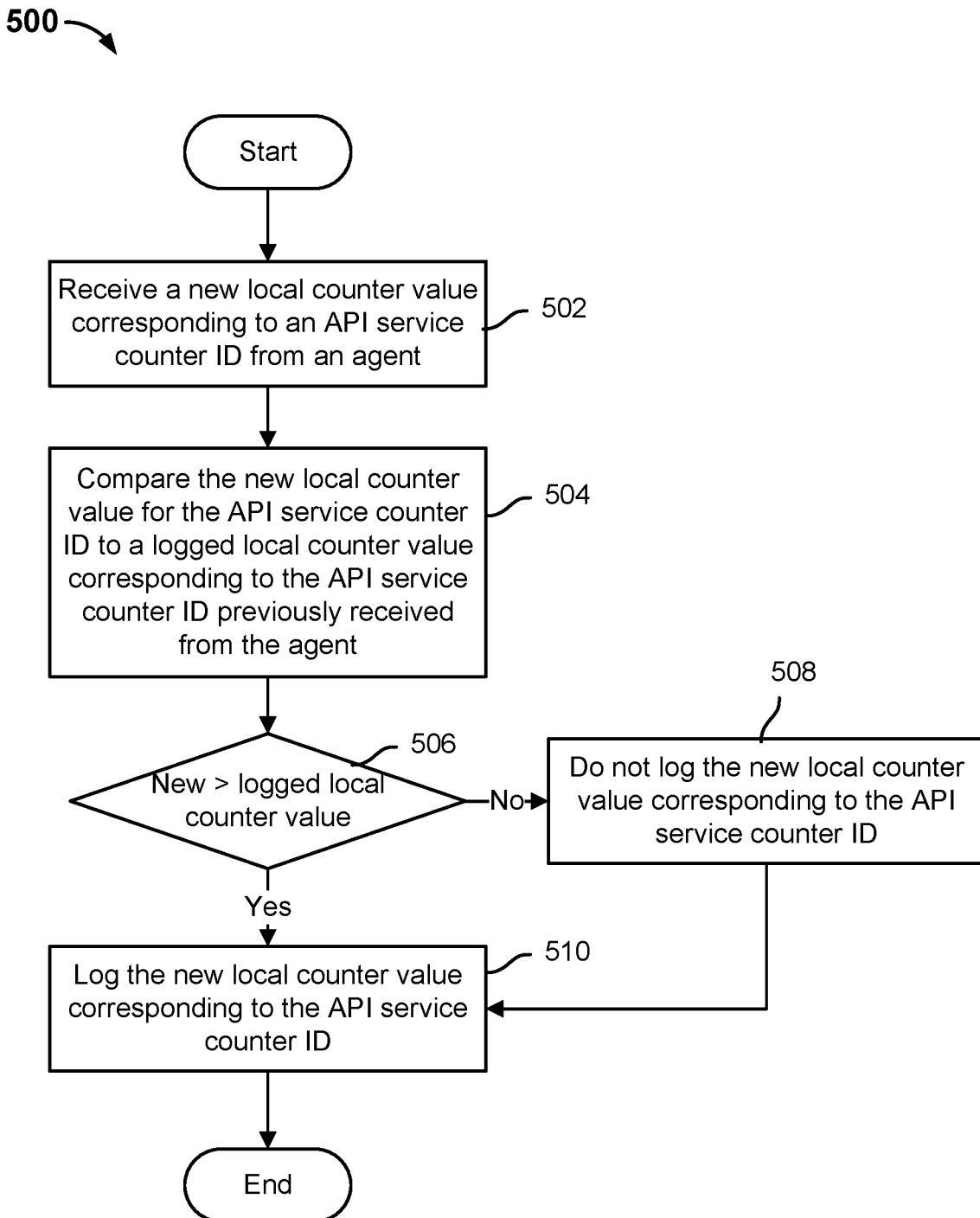
FIG. 5 is a flow diagram showing an example process for logging a new local counter value corresponding to an API service counter identifier at a master counter server.

FIG. 5 is a flow diagram showing an example process for logging a new local counter value corresponding to an API service counter identifier at a master counter server. In some embodiments, process 500 is implemented by a master counter server such as master counter server 102 of system 100 of FIG. 1.

Process 500 shows an example process that is performed by a master counter server that determines logging a new local counter value corresponding to an API service counter identifier that is received from an agent only if the new local counter value is determined to be greater than a logged local counter value corresponding to the same API service counter identifier that was previously received from the same agent.

At 502, a new local counter value corresponding to an API service counter identifier is received from an agent. The agent is executing at an edge server that is potentially remote to the master counter server. In some embodiments, a new local counter value corresponding to an API service counter identifier is periodically (e.g., every second) received from each agent.

At 504, the new local counter value corresponding to the API service counter identifier is compared to a logged local counter value corresponding to the API service counter identifier previously received from the agent. The new local counter value is compared to a logged local counter value corresponding to the API service counter identifier that was previously received from the same agent and stored, if one is available.

At 506, it is determined whether the new local counter value corresponding to the API service counter identifier is greater than the logged local counter value corresponding to the API service counter identifier. In the event that the new local counter value corresponding to the API service counter identifier is greater than the logged local counter value corresponding to the API service counter identifier, control is transferred to 510. Otherwise, in the event that the new local counter value corresponding to the API service counter identifier is not greater than the logged local counter value corresponding to the API service counter identifier, control is transferred to 508.

At 508, the new local counter value corresponding to the API service counter identifier is not logged. The previously stored local counter value corresponding to the API service counter identifier is maintained.

At 510, the new local counter value corresponding to the API service counter identifier is logged. The previously stored local counter value corresponding to the API service counter identifier is replaced by the new counter value as it is determined to be greater.

Figure 6:
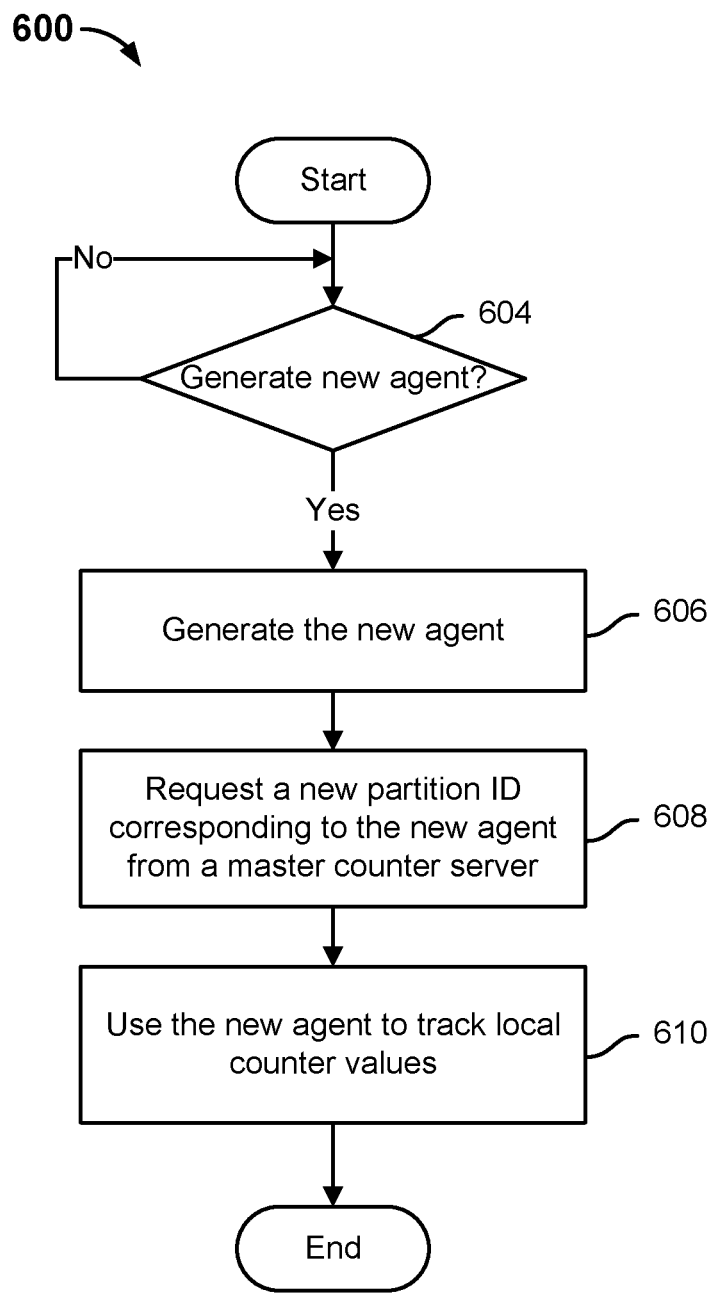
FIG. 6 is a flow diagram showing an example process for generating a new agent.

FIG. 6 is a flow diagram showing an example process for generating a new agent. In some embodiments, process 600 is implemented by an edge server such as edge server 110, 112, or 114 of system 100 of FIG. 1.

Process 600 describes an example process by which an edge server determines to generate a new agent.

At 604, it is determined whether a new agent is to be generated. In the event that a new agent is to be generated, control is transferred to 606. Otherwise, in the event that a new agent is not to be generated, control is returned to 604. In various embodiments, a new agent is determined to be generated when the storage allocation assigned to an existing agent that is executing at the edge server is completely consumed. In some embodiments, a previously generated agent executing at the edge server is disabled prior to or after the new agent is generated.

At 606, the new agent is generated. In some embodiments, the new agent is generated as a (e.g., Java) virtual machine (running at the same edge server) that is initialized (e.g., booted up). The new agent is also assigned an allocation of storage (e.g., in memory) in which to store local counter values corresponding to various API service counter identifiers for which the edge server processes API requests.

At 608, a new partition identifier corresponding to the new agent is requested from a master counter server. After the new agent has booted up, the agent is configured to query the master counter server for a new partition identifier to be assigned to it. The partition identifier will be sent from the new agent to the master counter server with future local counter values corresponding to API service counter identifiers.

At 610, the new agent is used to track local counter values. API requests corresponding to various API service counter identifiers that are serviced by the edge server after the new agent is generated will be tracked as corresponding local counter values by the new agent.

Figure 7:
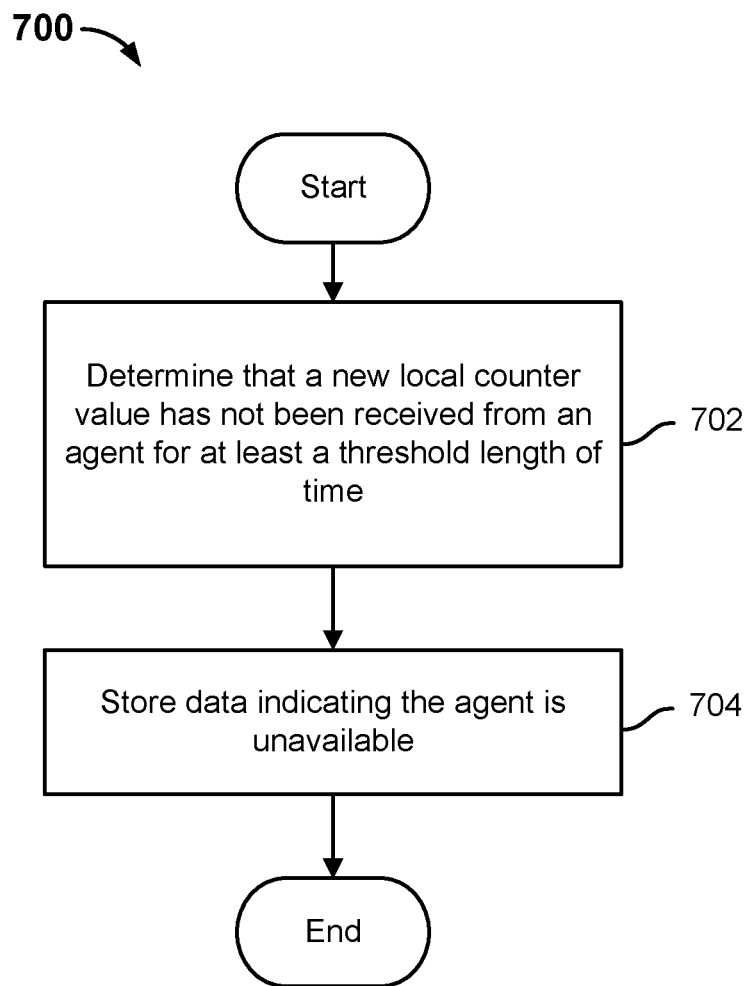
FIG. 7 is a flow diagram showing an example process for determining that an agent has become unavailable.

FIG. 7 is a flow diagram showing an example process for determining that an agent has become unavailable. In some embodiments, process 700 is implemented by a master counter server such as master counter server 102 of system 100 of FIG. 1.

At 702, it is determined that a new local counter value has not been received from an agent for at least a threshold length of time. The master counter server can determine that an agent has become unavailable based on, for example, determining that a new local counter value corresponding to any API service counter identifier has not been received from the agent for at least a threshold length of time. In some embodiments, the threshold length of time is configurable. For example, the threshold length of time is seven days.

At 704, data is stored that indicates that the agent is unavailable. A flag or other data value can be stored at the master counter server to indicate that the agent has become unavailable.

In various embodiments, during a "cleanse" process, the master counter server combines the local counter values of the same API service counter identifier associated with one or more unavailable agents into a single value (which is sometimes referred to as a "combined counter value") corresponding to that API service counter identifier, as will be described below in FIG. 8.

Figure 8:
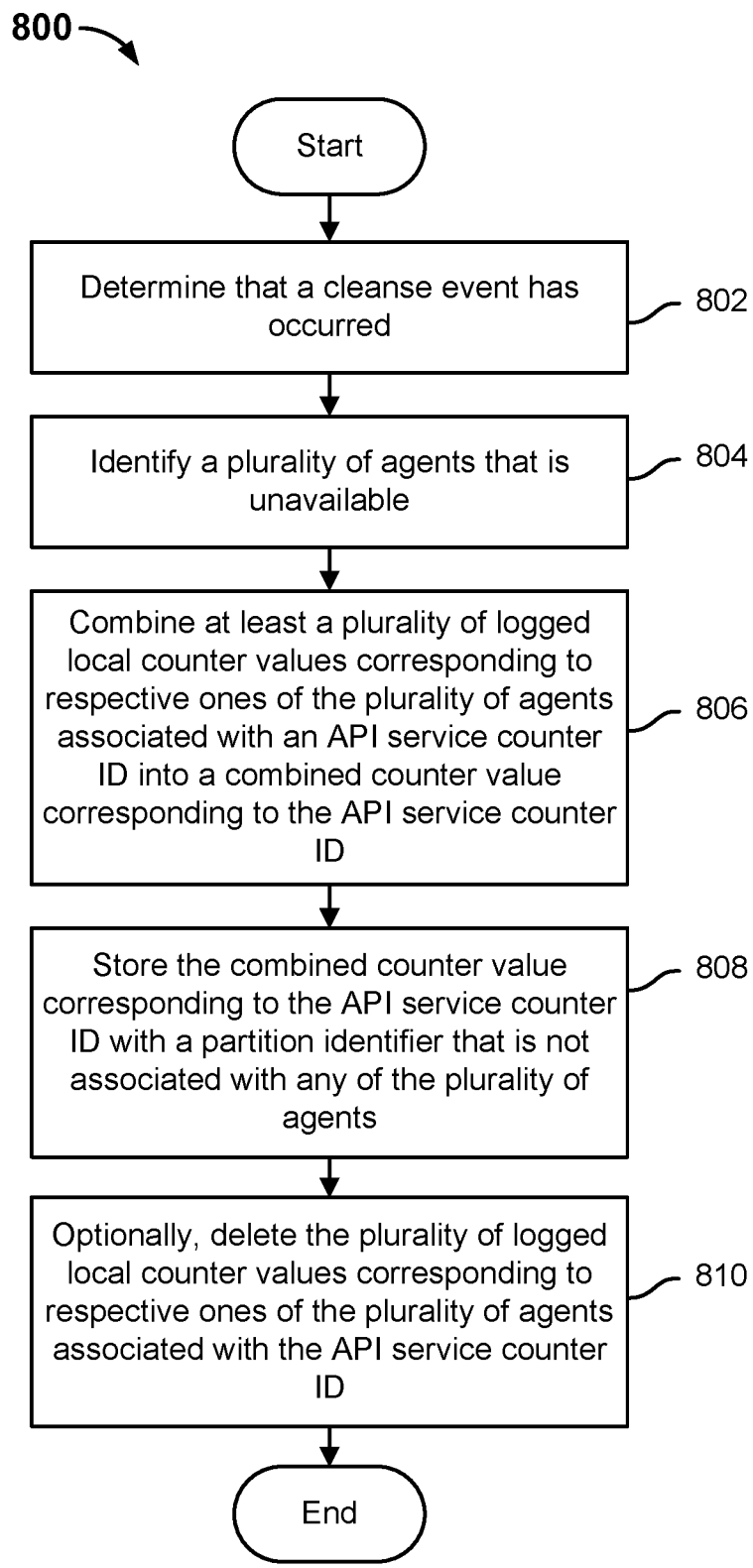
FIG. 8 is a flow diagram showing an example process for performing a cleanse process.

FIG. 8 is a flow diagram showing an example process for performing a cleanse process. In some embodiments, process 800 is implemented by a master counter server such as master counter server 102 of system 100 of FIG. 1.

Process 800 describes an example process in which the master counter server identifies agents that appear to be unavailable and combines the logged local counter values corresponding to the same API service counter identifier across the one or more unavailable agents into a single combined counter value corresponding to that API service counter identifier. The single combined counter value corresponding to that API service counter identifier is then stored without respect to any particular agent and will collectively represent the total counter value corresponding to an API service counter identifier across agents that are no longer available.

At 802, a cleanse event is determined to have occurred. In some embodiments, a "cleanse event" refers to an event that triggers the process of combining, at a master counter server, the logged counter values corresponding to an API service counter identifier across one or more agents that have been determined to be unavailable (to thereby remove individual records at the master counter server of these unavailable agents). In some embodiments, a cleanse event occurs at every predetermined interval of time. In some embodiments, a predetermined interval of time at which a cleanse event occurs is configurable. For example, the predetermined interval of time at which a cleanse event occurs may be a day, a week, or a month.

At 804, a plurality of agents that is unavailable is identified. For example, an agent can be identified as being unavailable using a process such as process 700 of FIG. 7.

At 806, at least a plurality of logged local counter values corresponding to respective ones of the plurality of agents associated with an API service counter identifier are combined into a combined counter value corresponding to the API service counter ID. Logged local counter value(s) that correspond to the same API service counter identifier that are associated with partition identifiers of unavailable agents are combined (e.g., summed together) into a single combined counter value to be associated with that API service counter identifier. Where a previously computed (e.g., at a previous cleanse event) combined counter value associated with that API service counter identifier already exists, the previously computed combined counter value associated with that API service counter identifier can be combined (e.g., summed together) with the new local counter value(s) that correspond to the same API service counter identifier that are associated with partition identifiers of unavailable agents that are identified in step 804 to determine an updated combined counter value to be associated with that API service counter identifier.

At 808, the combined counter value corresponding to the API service counter identifier is stored with a partition identifier that is not associated with any of the plurality of agents. Because the combined counter value to be corresponding to an API service counter identifier comprises counter values associated with agents that have been determined to be unavailable (e.g., disabled), the combined counter value to be corresponding to the API service counter identifier is stored with a partition identifier that is not associated with any of such unavailable agents or any agent at all. In some embodiments, the combined counter value to be associated with the API service counter identifier is stored with a predetermined partition identifier such as "internal," for example, that is collectively associated with unavailable agents.

In various embodiments, when the aggregated counter value corresponding to an API service counter identifier is requested (e.g., as in a process such as process 300 of FIG. 3), the combined counter value corresponding to the API service counter identifier that is stored with a predetermined partition identifier (e.g., "internal") is combined (e.g., summed together) with all the stored local counter values corresponding to the API service counter identifier that is stored with partition identifiers that are associated with agents that have (not yet) been determined to be unavailable.

At 810, optionally, the plurality of logged local counter values corresponding to respective ones of the plurality of agents associated with the API service counter identifier is deleted. Optionally, in some embodiments, the logged local counter values corresponding to the unavailable agents associated with the API service counter identifier are deleted (as their individual local counter values have already been collectively combined and stored as the combined counter value to be associated with the API service counter identifier).

Figure 9:
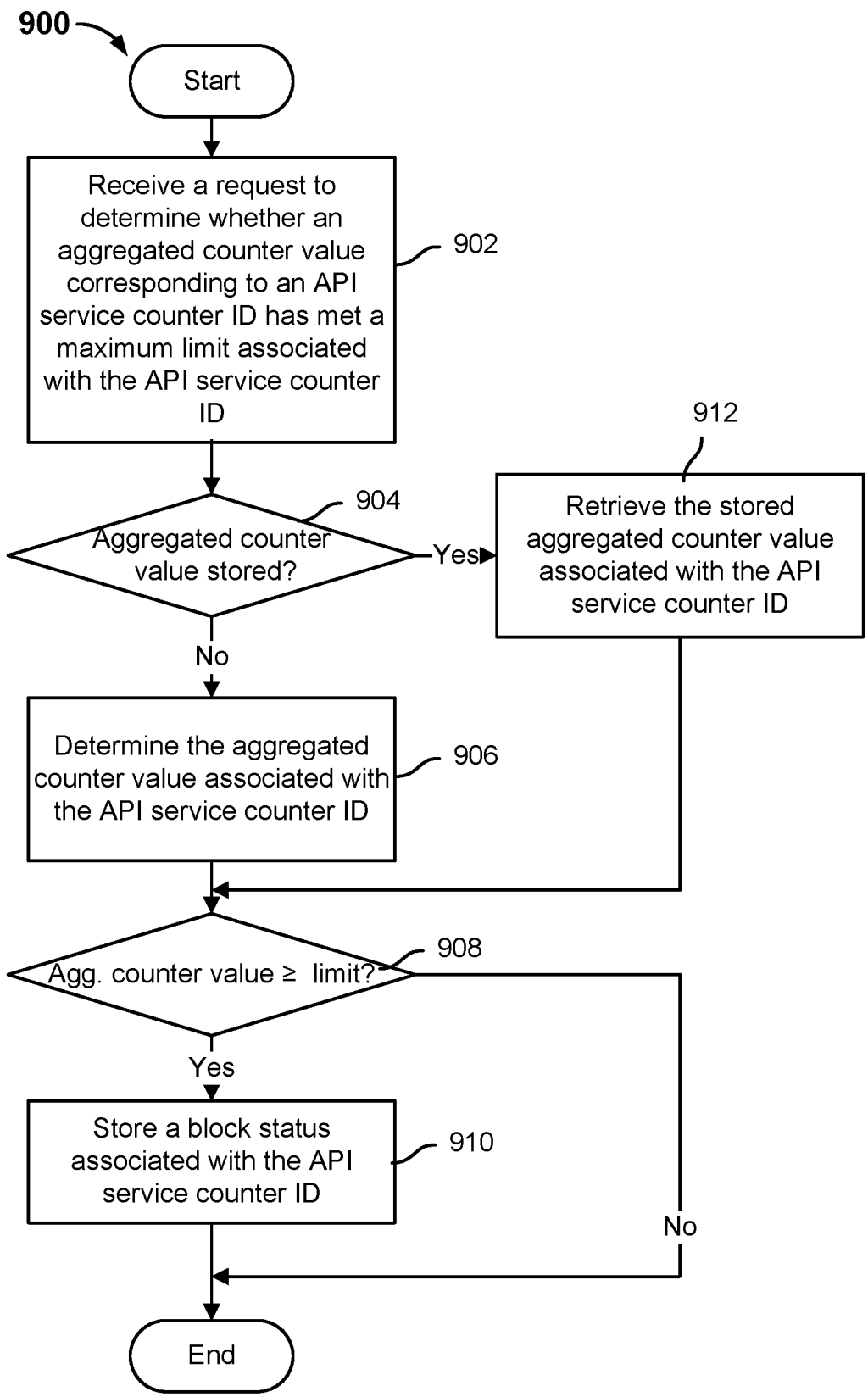
FIG. 9 is a flow diagram showing an example process for determining whether an aggregated counter value corresponding to an API service counter identifier has met a maximum limit associated with the API service counter identifier.

FIG. 9 is a flow diagram showing an example process for determining whether an aggregated counter value corresponding to an API service counter identifier has met a maximum limit associated with the API service counter identifier. In some embodiments, process 900 is implemented by a master counter server such as master counter server 102 of system 100 of FIG. 1.

Process 900 is an example process in which the master counter server determines whether the aggregated counter value corresponding to an API service counter identifier has met a maximum limit associated with the API service counter identifier and therefore should be associated with a block status.

At 902, a request to determine whether an aggregated counter value corresponding to an API service counter identifier has met a maximum limit associated with the API service counter identifier is received. In some embodiments, the request can be received from an agent or a developer user associated with the API service counter identifier. As described above, in various embodiments, the maximum limit associated with the API service counter identifier is determined by a rate plan purchased by a developer that is associated with the API service counter identifier. In various embodiments, the maximum limit is imposed on the number of API requests that can be handled across multiple (e.g., distributed) edge servers for a combination of a particular developer and a particular API service. In various embodiments, the maximum limits associated with various API service counter identifiers are stored centrally at the master counter server and not at edge servers so such limits remain transparent to and do not need to be maintained by the agents executing at the edge servers.

At 904, it is determined whether the aggregated counter value corresponding to the API service counter identifier is stored. In various embodiments, the aggregated counter value corresponding to the API service counter identifier is searched for in a cache associated with the master counter storage. In the event that the aggregated counter value corresponding to the API service counter identifier is not stored, control is transferred to 906. Otherwise, in the event that the aggregated counter value corresponding to the API service counter identifier is stored, control is transferred to 912, at which the stored aggregated counter value corresponding to the API service counter identifier is retrieved from a storage (e.g., cache).

At 906, the aggregated counter value corresponding to the API service counter identifier is determined. In some embodiments, the aggregated counter value can be determined using a process such as process 300 of FIG. 3.

At 908, it is determined whether the aggregated counter value corresponding to the API service counter identifier is equal to or greater than the maximum limit associated with the API service counter identifier. In the event that the aggregated counter value corresponding to the API service counter identifier is equal to or greater than the maximum limit associated with the API service counter identifier, control is transferred to 910. Otherwise, in the event that the aggregated counter value corresponding to the API service counter identifier is less than the maximum limit associated with the API service counter identifier, process 900 ends.

At 910, a block status associated with the API service counter identifier is stored. In some embodiments, the block status associated with the API service counter identifier will be queried as an update by one or more edge servers. Once the block status associated with the API service counter identifier is queried by an edge server, the edge server will not service any subsequently received API requests that are associated with the API service counter identifier.

FIGS. 10 through 13, below, describe examples of storing local counter values by an agent executing at an edge server and sending such local counter values by the agent to a master counter server in accordance with some embodiments.

FIG. 10 is a diagram showing an example of a set of local counter values that is stored by an agent executing at an edge server (e.g., an edge server such as edge server 110, 112, or 114 of system 100 of FIG. 1). As shown in the example, Agent A has stored in table 1000 a local counter value corresponding to each of various service counter identifiers such as at least "Cat," "Dog," "Mouse," and "Bird." As described above, an API service counter identifier maps to a combination of a particular developer of an API and a particular API service for which the developer has paid for a certain number of API requests to be processed. Each local counter value corresponding to an API service counter identifier represents the total number of API requests corresponding to that API service counter identifier that have been performed at the edge server on which the agent is executing. The local counter value corresponding to each API service counter identifier is updated after API requests corresponding to that API service counter identifier are serviced at the edge server. Periodically (e.g., every one second), Agent A sends each API service counter identifier and its current corresponding local counter value with an authentication token to a master counter server. The authentication token includes at least a partition identifier associated with Agent A.

FIG. 11 is a diagram showing an example of a set of local counter values that is stored by a master counter server (e.g., a master counter server such as master counter server 102 of system 100 of FIG. 1) prior to receiving new local counter values from an agent. As shown in the example, the master counter server to which Agent A of the example of FIG. 10 sends updates already stores the local counter values that are shown in table 1100 prior to receiving the new local counter values from Agent A that are shown in FIG. 10. Table 1100 stores the partition identifier of the agent from which each local counter value corresponding to a particular API service counter identifier was received and also the time ("Update Time") at which the local counter value was received from the agent. For example, entry 1102 of table 1100 comprises partition identifier A (which is associated with Agent A), API service counter identifier "Cat," local counter value "8," and a latest update time of "12:00:00."

Each time that the master counter server receives from an agent a new local counter value corresponding to an API service counter identifier, prior to logging the new local counter value, the master counter server checks whether the new local counter value is greater than a previously logged local counter value corresponding to the same API service counter identifier from the same agent, if one exists. The master counter server will only log the new local counter value if no local counter value corresponding to the same API service counter identifier has been previously received from the same agent or if the new local counter value is greater than the previously logged local counter value corresponding to the same API service counter identifier from the same agent, as will be described with the example of FIG. 12, below.

Figure 12:
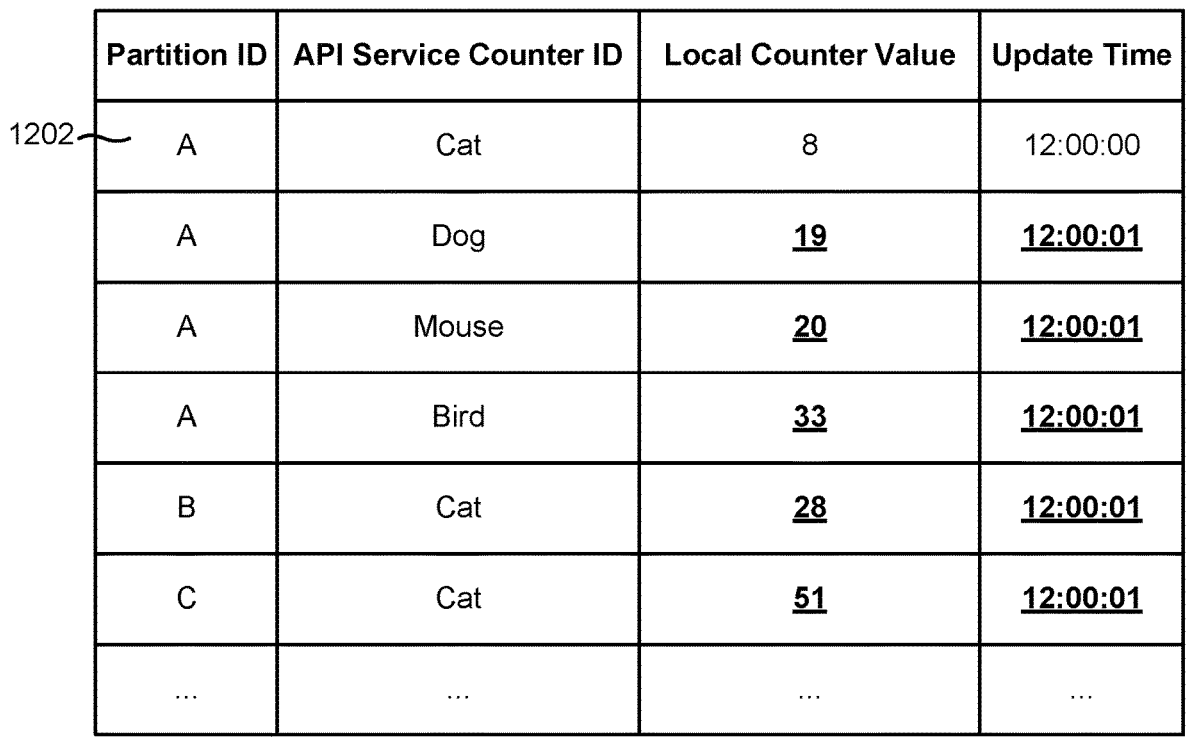
FIG. 12 is a diagram showing an example of a set of local counter values that is stored by a master counter server subsequent to receiving new local counter values from various agents.

FIG. 12 is a diagram showing an example of a set of local counter values that is stored by a master counter server (e.g., a master counter server such as master counter server 102 of system 100 of FIG. 1) subsequent to receiving new local counter values from various agents. As shown in table 1200, the master counter server received an update at 12:00:01 from Agent A that included the local counter values ("8," "19," "20," and "33") corresponding to the API service counter identifiers associated with "Cat," "Dog," "Mouse," and "Bird" that are shown in FIG. 10. The master counter server also received an update at 12:00:01 from Agent B that included local counter value "28" corresponding to API service counter identifier "Cat" and an update at 12:00:01 from Agent C that included local counter value "51" corresponding to API service counter identifier "Cat." All received new local counter values corresponding to value API service counter identifiers from the agents are greater than the previous logged local counter values received from those agents and will therefore replace the previously stored local counter values, except for entry 1202 that includes partition identifier A, API service counter identifier "Cat," local counter value "8," and a latest update time of "12:00:00" because the new local counter value ("8") received from Agent A at 12:00:01 was not greater than the previously logged local counter value ("8"). The newly logged local counter values are shown as being underlined and bolded in table 1200.

FIG. 13 is a diagram showing an example of a set of local counter values that is stored by a master counter server (e.g., a master counter server such as master counter server 102 of system 100 of FIG. 1) subsequent to determining that agents have become unavailable and subsequent to performing a cleanse process. After the state that the master counter server was shown in FIG. 12, Agent A had sent one or more updates of new local counter values corresponding to various API service counter identifiers to the master counter server and table 1300 was updated accordingly. However, it was determined at the master counter server that neither Agents B nor C had sent any updates to the master counter server for at least a threshold length of time and the master counter server had therefore determined that Agents B and C had become unavailable (e.g., Agents B and C had become disabled at their respective edge servers due to their respective storage allocations being used up). At a subsequent cleanse event, the master counter server had determined that it had logged local counter values corresponding to the same API service counter identifier of "Cat" from both Agents B and C. Therefore, during the cleanse process, the master counter server had combined (e.g., summed together) the respective logged local counter values corresponding to the same API service counter identifier of "Cat" from both Agents B and C. As shown in table 1200 of FIG. 12, the local counter values corresponding to the same API service counter identifier of "Cat" from both Agents B and C logged by the master counter server were "28" and "51," respectively. As such, the combined counter value corresponding to the API service counter identifier of "Cat" from both Agents B and C is "79." The master counter server then created new entry 1304 in table 1300 that stores the local counter value of "79" for the API service counter identifier of "Cat" for a partition identifier of "internal," which is a predetermined partition identifier that is not associated with any particular agent but collectively represents agents that are no longer available. In the example of FIG. 13, the stored entries that included the local counter values of "28" and "51" corresponding to the API service counter identifier of "Cat" from both Agents B and C are removed/deleted from table 1300.

In the event that the master counter server (before updates are made to table 1300 of the example of FIG. 13) receives a subsequent request for an aggregated counter value corresponding to the API service counter identifier of "Cat," the master counter server would determine that there are two entries in table 1300 that include the local counter value corresponding to the API service counter identifier of "Cat." The two entries are entry 1302 that includes a local counter value, "10," corresponding to the API service counter identifier of "Cat" that was previously received from Agent A and new entry 1304 that includes a local counter value, "79," corresponding to the API service counter identifier of "Cat" that was previously determined from combining the local counter values of unavailable Agents B and C. Therefore, to determine the aggregated counter value corresponding to the API service counter identifier of "Cat," the master counter server would sum together the local counter values corresponding to these two entries to obtain the aggregated counter value corresponding to the API service counter identifier of "Cat" of (10+79=) 89. The master counter server could return the aggregated counter value corresponding to the API service counter identifier of "Cat" to the requestor and/or store the aggregated counter value in a cache (e.g., with a predetermined time-to-live value) such that subsequent requests for the aggregated counter value corresponding to the API service counter identifier of "Cat" that are received prior to the expiration of the time-to-live value may be serviced from the cache.

Figure 14:
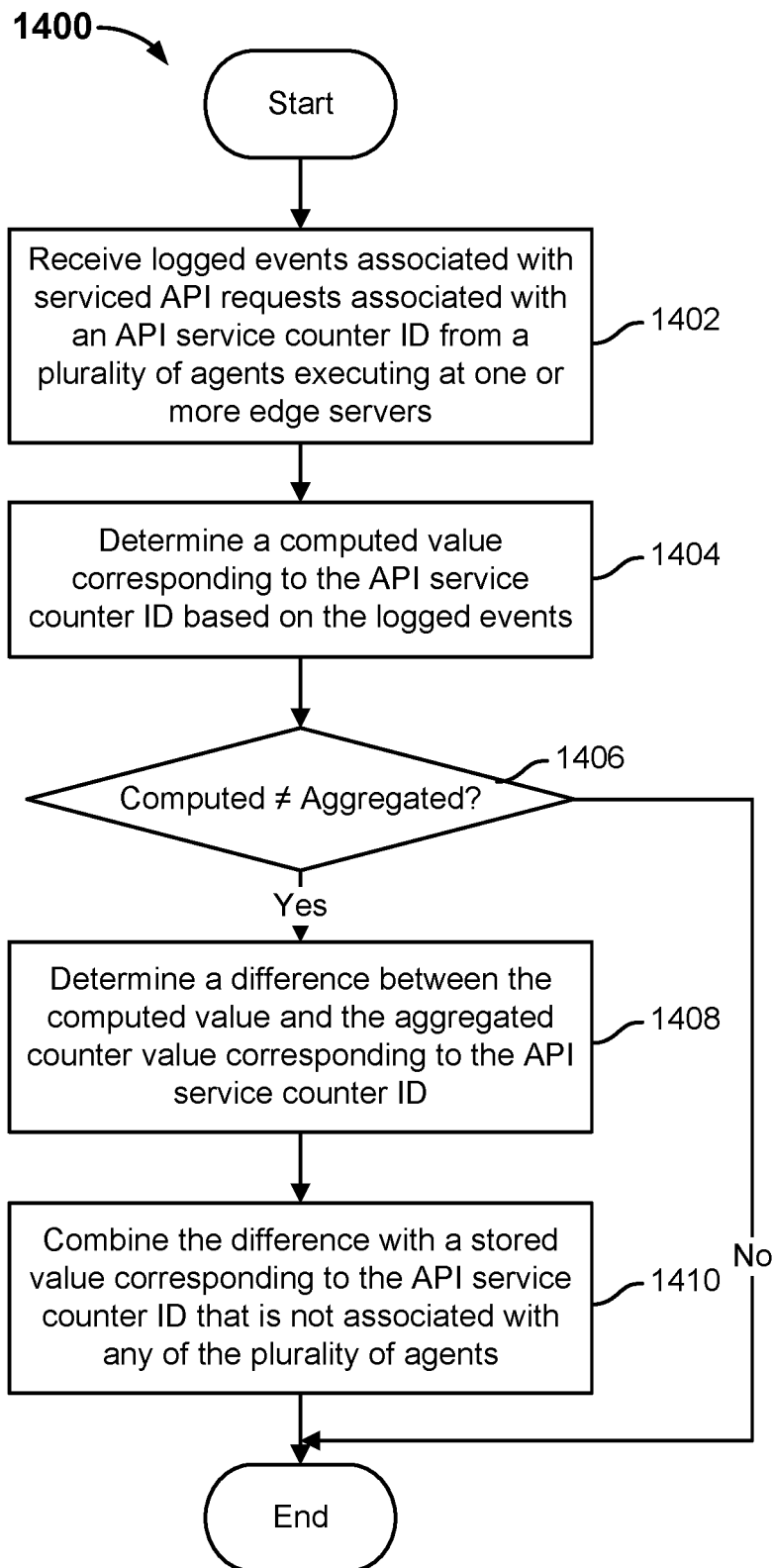
FIG. 14 is a flow diagram showing an embodiment of a process for performing a reconciliation process for a particular API service counter identifier between logged events of serviced API service requests and logged local counter values at a master counter server.

FIG. 14 is a flow diagram showing an embodiment of a process for performing a reconciliation process for a particular API service counter identifier between logged events of serviced API service requests and logged local counter values at a master counter server. In some embodiments, process 1400 is implemented by a master counter server such as master counter server 102 of system 100 of FIG. 1.

It is possible that an agent/edge server loses connection with the master counter server (e.g., for at least a period of time) and as a result, may be able to continue to locally service API requests and update stored local counter values but is unable to send the updated stored local counter values to the master counter server. As a result, the local counter values that are logged at the master counter server may not correctly reflect the local counter values that are stored by the edge servers. Process 1400 describes an example of a reconciliation process in which the master counter server reviews logged events of serviced API requests that are received from the agents to determine whether a total counter value corresponding to an API service counter identifier that is computed from the logged events differs from an aggregated counter value that is determined based on the local counter values corresponding to the API service counter identifier that are stored at the master counter server. In some embodiments, process 1400 may be performed periodically using the logged events that have been received since a previous reconciliation process.

At 1402, logged events associated with serviced API requests associated with an API service counter identifier are received from a plurality of agents executing at one or more edge servers. In various embodiments, the logged events describe each API service counter identifier corresponding to each API request that was serviced by a particular agent (e.g., associated with a particular identifier) and a time at which the API request was serviced.

At 1404, a computed value associated with the API service counter identifier is determined based on the logged events. The logged number of API requests corresponding to each API service counter identifier that is serviced by any edge server is counted among the logged events to compute the value that is the total number of API requests that have been serviced corresponding to each API service counter identifier.

At 1406, it is determined whether an aggregated value associated with the API service counter identifier is not equal to the computed value associated with the API service counter identifier. In the event that the aggregated value associated with the API service counter identifier is not equal to the computed value associated with the API service counter, control is transferred to 1408. Otherwise, in the event that the aggregated value associated with the API service counter identifier is equal to the computed value associated with the API service counter, process 1400 ends. The computed value that is the total number of API requests that have been serviced corresponding to each API service counter identifier is compared against an aggregated counter value corresponding to each API service counter identifier. For example, the aggregated counter value corresponding to each API service counter identifier can be determined by combining all of the logged local counter values corresponding to that API service counter identifier and one or more partition identifiers that have been stored at the master counter server. If a difference between these two values corresponding to an API service counter identifier exists, then it indicates that the master counter server had not received all the local counter values corresponding to the API service counter identifier that should have been sent by agents.

At 1408, a difference between the aggregated value associated with the API service counter identifier and the computed value associated with the API service counter identifier is determined. The difference represents the number of API requests corresponding to the API service counter identifier that have been serviced by one or more edge servers but have not been successfully posted to the master counter server.

At 1410, the difference is combined with a stored value associated with the API service counter identifier that is not associated with any of the plurality of agents. The difference is then attributed to the API service counter identifier by combining it with (e.g., adding it to) an existing local counter value corresponding to the API service counter identifier that is already stored at the master counter server. In some embodiments, the difference is added to a local counter value of a stored entry corresponding to the API service counter identifier that is associated with a predetermined partition identifier that is not associated with any particular available agent (e.g., the partition identifier of "internal").

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:

1. A method for processing application programming interface (API) requests in a computing system, comprising:
   receiving a plurality of local counter values from a plurality of computing devices distributed throughout the computing system, the plurality of local counter values corresponding to one or more API service counter identifiers;
   receiving, from a first computing device of the plurality of computing devices, a status update request associated with a first API service counter identifier;
   aggregating, based on the first API service counter identifier, one or more of the plurality of local counter values received from the plurality of computing devices and associated with the first API service counter identifier to produce a first aggregated local counter value;
   determining if the first aggregated local counter value associated with the first API service counter identifier meets a threshold value; and
   providing a status indicator to the first computing device indicating that the aggregated local counter value associated with the first API service counter identifier meets or exceeds the threshold value.

2. The method of claim 1, comprising associating each of the plurality of local counter values received from the plurality of computing devices with a partition identifier.

3. The method of claim 2, comprising logging each of the plurality of local counter values received from the plurality of computing devices with their respective partition identifier.

4. The method of claim 1, comprising comparing a received counter value of the plurality of local counter values to a previously logged counter value corresponding to an API service counter identifier and a partition identifier associated with the computing device from which the received counter value was received.

5. The method of claim 4, comprising logging the received counter value if it is greater than the previously logged counter value.

6. The method of claim 1, wherein each of the plurality of computing devices comprises one or more agents from which the plurality of local counter values are received.

7. The method of claim 1, comprising sending data associated with the first API service counter identifier to the first computing device.

8. The method of claim 7, wherein the data sent comprises updated data since a prior status update request.

9. A system for processing application programming interface (API) requests, comprising:
   memory; and
   one or more processors in communication with the memory, the one or more processors configured to:
   receive a plurality of local counter values from a plurality of computing devices distributed throughout a computing system, the plurality of local counter values corresponding to one or more API service counter identifiers;
   receive, from a first computing device of the plurality of computing devices, a status update request associated with a first API service counter identifier;
   aggregate, based on the first API service counter identifier, one or more of the plurality of local counter values received from the plurality of computing devices and associated with the first API service counter identifier to produce a first aggregated local counter value;
   determine if the first aggregated local counter value associated with the first API service counter identifier meets a threshold value; and
   provide a status indicator to the first computing device indicating that the aggregated local counter value associated with the first API service counter identifier meets or exceeds the threshold value.

10. The system of claim 9, wherein the one or more processors are further configured to associate each of the plurality of local counter values received from the plurality of computing devices with a partition identifier.

11. The system of claim 10, wherein the one or more processors are further configured to log each of the plurality of local counter values received from the plurality of computing devices with their respective partition identifier.

12. The system of claim 9, wherein the one or more processors are further configured to compare a received counter value of the plurality of local counter values to a previously logged counter value corresponding to an API service counter identifier and a partition identifier associated with the computing device from which the received counter value was received.

13. The system of claim 12, wherein the one or more processors are further configured to log the received counter value if it is greater than the previously logged counter value.

14. The system of claim 9, wherein each of the plurality of computing devices comprises one or more agents from which the plurality of local counter values are received.

15. The system of claim 9, wherein the one or more processors are further configured to send data associated with the first API service counter identifier to the first computing device.

16. The system of claim 15, wherein the data sent comprises updated data since a prior status update request.

17. A non-transitory computer-readable medium storing instructions executable by one or more processors for performing a method of processing application programming interface (API) requests in a computing system, comprising:
    receiving a plurality of local counter values from a plurality of computing devices distributed throughout the computing system, the plurality of local counter values corresponding to one or more API service counter identifiers;
    receiving, from a first computing device of the plurality of computing devices, a status update request associated with a first API service counter identifier;
    aggregating, based on the first API service counter identifier, one or more of the plurality of local counter values received from the plurality of computing devices and associated with the first API service counter identifier to produce a first aggregated local counter value;
    determining if the first aggregated local counter value associated with the first API service counter identifier meets a threshold value; and
    providing a status indicator to the first computing device indicating that the aggregated local counter value associated with the first API service counter identifier meets or exceeds the threshold value.

* * * * *